Nov. 23, 1926.   1,608,018
M. ELDRED
FUEL ECONOMIZER FOR INTERNAL COMBUSTION MOTORS
Filed March 5, 1926

Inventor
Melville Eldred
By John A. Bomhardt
Attorney

Patented Nov. 23, 1926.

1,608,018

UNITED STATES PATENT OFFICE.

MELVILLE ELDRED, OF CLEVELAND, OHIO.

FUEL ECONOMIZER FOR INTERNAL-COMBUSTION MOTORS.

Application filed March 5, 1926. Serial No. 92,526.

This invention relates to new and useful improvements in fuel economizers for internal combustion motors providing means for mixing, superheating and supplying through the intake manifold an improved auxiliary combustion mixture comprising gasoline tank vapor, crankcase oil vapor and radiator steam, to combine with and enrich the combustive qualities of the regular carburetor vaporized gasoline fuel which may be materially reduced thereby effecting a more efficient and economical consumption of gasoline while increasing the power and efficiency of the motor.

Another object is to provide a device of simple structure without moving parts, requiring no adjustment or attention for operation of the motor, functioning and regulating automatically.

A further object is to provide improved heat conducting, retaining and mixing means for superheating and mixing the auxiliary combustion mixture. Other objects and features of the invention will be hereinafter pointed out and described.

In the drawings:—

Figure 1:
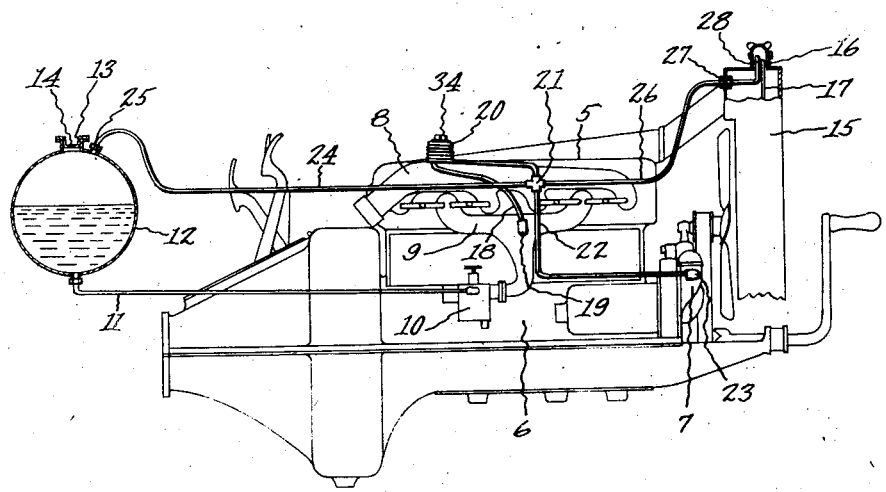
Fig. 1 is a side elevation of an internal combustion automobile motor connected to a radiator and gasoline tank, having the invention applied thereto.

Referring to Fig. 1 of the drawings, 5 indicates an internal combustion automobile motor having a crankcase 6 with breather or oil filling tube 7, exhaust manifold 8, intake manifold 9, carburetor 10 connected by supply pipe 11 to a suitably located gasoline tank 12 provided with screw threaded filling cap 13 vented at 14. The radiator 15 connected to the motor water cooling system in the usual manner has a screw capped filling neck 16 into which partially extends water overflow pipe 17.

The suction created by the motor pistons draws the auxiliary combustion mixture into the intake manifold through tube 18 connected thereto by screw threaded elbow 19 the tube 18 forming a coil 20, to be hereinafter described mounted on exhaust manifold 8 for superheating and mixing the auxiliary mixture, and having the opposite end connected to a four-way cross fitting 21. A tube 22 branching downwardly from fitting 21 is connected to the breather tube 7 of crankcase 6 by elbow 23. A tube 24 branching rearwardly from fitting 21 is suitably connected at 25 to the gasoline tank 12 above the liquid level. A tube 26 branching forwardly is connected at the rear of radiator 15 as at 27 to an L-shaped tube 28 extending up into the filling neck 16 above the water level.

Figure 3:
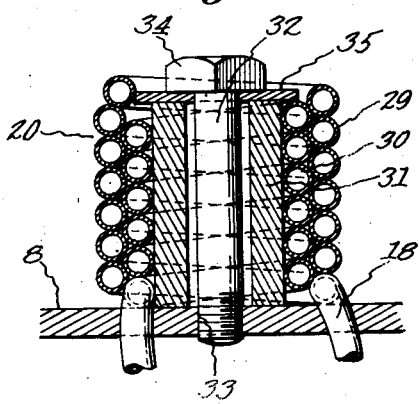
Fig. 3 is a section on line 3—3 of Fig. 2.
Figure 2:
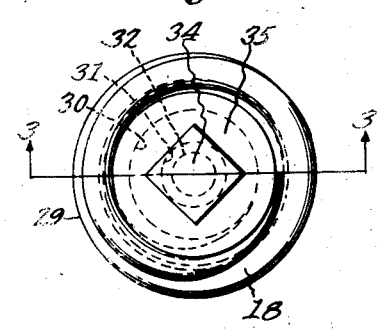
Fig. 2 is a detail plan view of the heating coil.

As shown in Figs. 2 and 3 the superheating coil comprises outer coil 29 closely wound about connecting inner coil 30 closely wound about annular heat conducting and retaining tube 31 having an extra thick wall. The coil 20 is adapted to be mounted for heating on the exhaust manifold preferably near the outlet where it is the hottest by means of bolt 32 screw threaded into the manifold as at 33. A washer 35 under bolt head 34 securely retains the tube 20 and coils 29 and 30. The coils 29 and 30 closely wound on the extra thick tube 31 contacting with the hot exhaust manifold, readily conduct and retain heat therefrom, superheating the auxiliary combustion mixture as it passes through the coils. The coils and tube connections are preferably of soft copper permitting easy bending of the tubes for installation.

The suction created by the downward piston strokes of the motor draws the regular vaporized gasoline fuel, from carburetor 10 connected by supply pipe 11 to tank 12, through the intake manifold into the combustion chambers of the cylinders for firing in the usual manner.

The auxiliary combustion mixture is also drawn by the piston suction into the intake manifold, where it mixes and combines with the regular fuel, through tube 18, coil 20 and cross fitting 21 to where the crankcase oil vapor is drawn through tube 22, the gasoline tank vapor through tube 24, and radiator steam through tubes 26 and 28, thoroughly mixing and superheating when passing through tube 18 and coil 20.

When desirable in exceptional installation to regulate closely the auxiliary mixture, a regulating valve may be inserted in tube 18.

While I have shown and described one embodiment of my invention, obviously various changes in the details of construction of the parts may be made without departing from the spirit and scope of the appended claims.

I claim:

1. The combination with the intake manifold of an internal combustion engine, of a pipe provided with a heating coil, leading to said manifold, a fuel supply tank, a radiator, a crankcase, and pipe connections between the coil and the upper part of the radiator, the upper part of the fuel tank, and the upper part of the crankcase.

2. The combination with the intake manifold of an internal combustion engine, of a pipe provided with a heating coil, leading to said manifold, a fuel supply tank, a radiator, a crankcase, and pipe connections between the coil and the upper part of the radiator, the upper part of the fuel tank, and the upper part of the crankcase, the coil being mounted on the exhaust manifold of the engine.

In testimony whereof, I do affix my signature.

MELVILLE ELDRED.